US011911802B2

(12) United States Patent
Schmidt et al.

(10) Patent No.: US 11,911,802 B2
(45) Date of Patent: Feb. 27, 2024

(54) METHODS AND SYSTEMS FOR SORTING COTTONSEED

(71) Applicant: BASF Agricultural Solutions Seed US LLC, Durham, NC (US)

(72) Inventors: Sebastian Ulrich Schmidt, Herdecke (DE); Jeff Ratliff, Lubbock, TX (US); Benno Franz Ulfik, Leverkusen (DE); Fatma Alexia Van Winssen, Odenthal (DE); Tonya Crossland, Lubbock, TX (US); Hartmut Huebner, Cologne (DE)

(73) Assignee: BASF Agricultural Solutions Seed US LLC, Research Triangle Park, NC (US)

( * ) Notice: Subject to any disclaimer, the term of this patent is extended or adjusted under 35 U.S.C. 154(b) by 0 days.

(21) Appl. No.: 17/692,461

(22) Filed: Mar. 11, 2022

(65) Prior Publication Data

US 2022/0193732 A1 Jun. 23, 2022

Related U.S. Application Data

(60) Division of application No. 16/667,280, filed on Oct. 29, 2019, now Pat. No. 11,298,723, which is a continuation of application No. 15/634,015, filed on Jun. 27, 2017, now abandoned.

(60) Provisional application No. 62/356,149, filed on Jun. 29, 2016.

(51) Int. Cl.

| | |
|---|---|
| ***B07C 5/34*** | (2006.01) |
| ***B07C 5/342*** | (2006.01) |
| ***B03B 4/06*** | (2006.01) |

(52) U.S. Cl.
CPC .............. *B07C 5/3425* (2013.01); *B03B 4/06* (2013.01)

(58) Field of Classification Search
CPC ......... B07C 5/342; B07C 5/3425; B07C 5/38; B07B 13/08; B07B 13/113; B03B 4/06
See application file for complete search history.

(56) References Cited

U.S. PATENT DOCUMENTS

| | | | |
|---|---|---|---|
| 5,245,188 | A | 9/1993 | Satake et al. |
| 5,733,592 | A | 3/1998 | Wettstein et al. |
| 7,968,814 | B2 | 6/2011 | Imai et al. |
| 8,985,342 | B2 | 3/2015 | Tanaka |
| RE45,489 | E | 4/2015 | Hunter et al. |
| 9,275,265 | B2 | 3/2016 | Deppermann et al. |

(Continued)

OTHER PUBLICATIONS

McCarty, William H. et al., Cottonseed Quality Evaluation, Cooperative Extension Service, Mississippi State University, 1978, pp. 1-12.

(Continued)

*Primary Examiner* — Joseph C Rodriguez
(74) *Attorney, Agent, or Firm* — Barbara Campbell

(57) ABSTRACT

Methods and devices for sorting cottonseeds. Methods include the use of an optical sorter to sort cottonseed by color. Additionally, methods include sorting cottonseed using a gravity table to collect high-density seed ("accepts") and mid-density seed ("middlings"), followed by sorting the mid-density, and optionally, the high-density seed using an optical sorter to collect dark cottonseed, thereby providing high-quality cottonseed for packaging. Devices and systems comprising one or more gravity tables and one or more optical sorters are provided.

7 Claims, 7 Drawing Sheets

(56) References Cited

U.S. PATENT DOCUMENTS

| | | | |
|---|---|---|---|
| 9,278,377 B2 | 3/2016 | Brumback et al. | |
| 9,463,493 B1 | 10/2016 | Arlinghaus et al. | |
| 9,968,937 B2 | 5/2018 | Zietlow et al. | |
| 10,034,490 B2 | 7/2018 | Davis et al. | |
| 2009/0194463 A1 | 8/2009 | Isbell | |
| 2011/0317001 A1 | 12/2011 | Massen | |
| 2013/0229647 A1* | 9/2013 | Fredlund | B07C 5/3425 356/51 |
| 2014/0027011 A1 | 1/2014 | Bahr et al. | |
| 2015/0125583 A1* | 5/2015 | Blass | B02B 3/00 209/44.3 |
| 2019/0383733 A1 | 12/2019 | Allen et al. | |
| 2020/0367422 A1 | 11/2020 | Shniberg et al. | |
| 2022/0012519 A1* | 1/2022 | Treboux | G06V 10/82 |

OTHER PUBLICATIONS

Conditioning, Cotton Physiology, The Cotton Foundation, 1986, pp. 502-503.

Agricultural Seeds Optical Sorting, Buhler, pp. 1-12, undated.

* cited by examiner

METHODS AND SYSTEMS FOR SORTING COTTONSEED

CROSS-REFERENCE TO RELATED APPLICATIONS

This application is a divisional of U.S. patent application Ser. No. 16/667,280, filed 29 Oct. 2019, which is a continuation of U.S. patent application Ser. No. 15/634,015, filed 27 Jun. 2017, which claims the benefit of U.S. Provisional Application Ser. No. 62/356,149, filed 29 Jun. 2016, the content of these applications is herein incorporated by reference in their entirety.

BACKGROUND

1. Field

The present invention relates to improved methods, systems, and apparatus for sorting cottonseeds. In particular, the present disclosure provides methods for separation of high-quality cottonseeds using an optical sorter.

2. Description of Related Art

Cottonseeds are delinted, cleaned, and graded to prepare and identify high quality cottonseed for marketing. The close association of seed density and quality in cottonseed has been recognized at least since the 1940s. Presently, gravity tables are used in the cottonseed industry to separate the high-density, mature seeds from the low-density, immature seeds. The low-density seeds are discarded and the high-density seeds are treated and packaged for commercialization (Delouche, Cotton Physiology, pp. 502-503, The Cotton Foundation, 1986).

However, use of gravity tables suffers from a number of drawbacks. Gravity tables are highly sensitive and require frequent monitoring and manual adjustment to ensure the table is operating optimally. This leads to an inherent lack of precision and variability of results depending on the skill and diligence of the operator. Other factors also influence the sorting process, including flow rate of the air current, inclination of the fluidized bed in two directions, vibration frequency and vibration amplitude. Therefore, use of gravity sorters to separate quality cottonseeds from non-quality cottonseeds can produce variable results even within one lot and requires high manpower.

Additionally, many good-quality cottonseeds are discarded using current sorting methods. This results in loss of potential sales. Therefore, improved methods for sorting cottonseeds are needed to reduce or eliminate wasted cottonseed.

BRIEF SUMMARY

Methods of improving the sorting of cottonseed has been investigated. During this investigation, it was attempted to use an optical sorter. It was surprisingly found that the use of optical sorters, with or without mechanical sorting, improves yield of high-quality cottonseeds. It was unknown whether optical sorters could effectively be used in the cotton industry, or provide any advantages over prior techniques. Applicants have surprisingly found that optical sorters can be used and provide advantageous results. A further advantage is that optical sorters are more automatable than mechanical sorters, thus enabling the use of less manpower.

A method for sorting cottonseed using an optical sorter is provided. The method is useful for separating a heterogeneous population of cottonseed to obtain a desired population with increased homogeneity. Individual seeds in the heterogenous population of cottonseed may differ with respect to, and be sorted by, any physical property, including but not limited to color, shape, size, chemical composition and/or structural properties, In some embodiments, the optical sorter is programmed to accept dark cottonseed and reject light cottonseed. The optical sorter may be a monochromatic sorter, a bichromatic sorter, or any other suitable optical sorter.

In some embodiments, the method further comprises separating the cottonseed using a gravity table before or after using the optical sorter. In a preferred embodiment, said separating is performed prior to sorting using an optical sorter.

In some embodiments, the gravity table is used to separate the cottonseed into an accept fraction, a middling fraction, and a reject fraction.

In some embodiments, the middling fraction and optionally, the reject fraction are sorted using the optical sorter.

A method for cleaning cottonseed is provided, comprising:

(a) sorting cottonseed using a gravity table to collect a high-density seed fraction, a mid-density seed fraction, and a low-density seed fraction;

(b) sorting the mid-density seed, and optionally, the low-density seed using an optical sorter to collect dark cottonseed; and (c) combining the high-density seed fraction of (a) and the dark cottonseed of (b) to obtain a high-quality seed fraction.

The method may further comprise:

(d) packaging the high-quality cottonseed fraction.

In some embodiments, the high-quality cottonseed fraction is further sorted using an optical sorter to remove broken cottonseed prior to packaging. In some embodiments, the high-quality cottonseed fraction is further sorted using an optical sorter to remove broken cottonseed due to the occurrence of any event that might result in broken cottonseed, such as but not limited to a packaging event, a transportation event or a storage event. In some embodiments, the high-quality cottonseed is coated prior to sorting to remove broken cottonseed.

A system or device is provided comprising a combination of one or more optical sorter(s) and one or more gravity table(s).

In some embodiments, the system or device comprises an optical sorter and a gravity table.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements.

DETAILED DESCRIPTION

Figure 1:
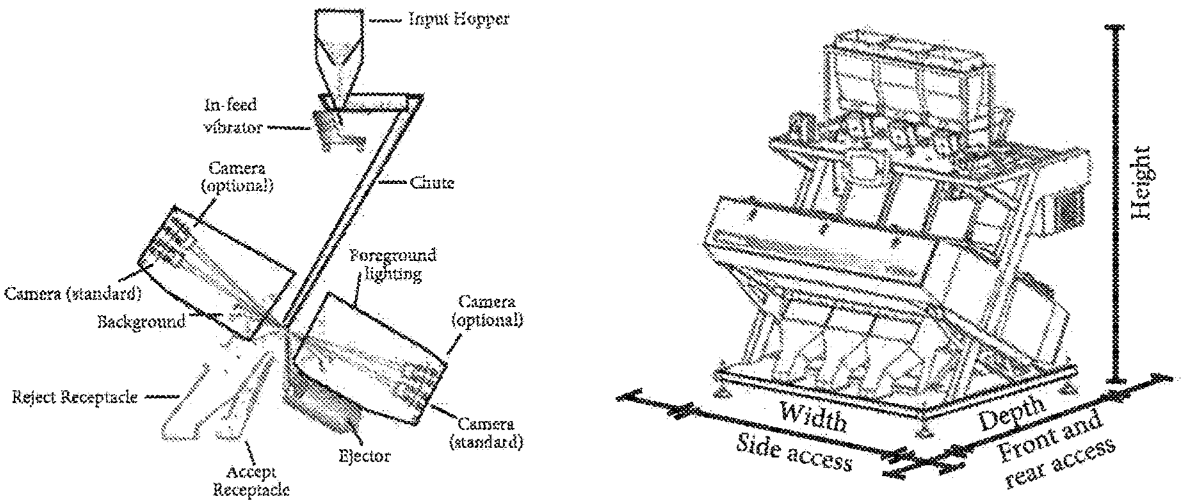
FIG. 1 shows a diagram illustrating the principle of color sorting, using, e.g. a Bühler color sorter type Z+.
Figure 2:
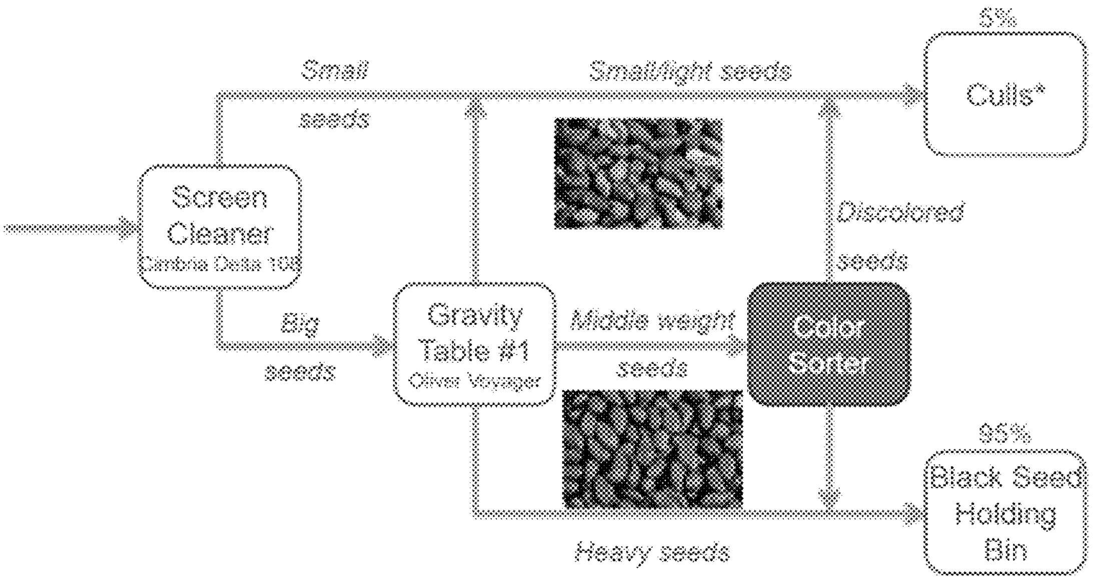
FIG. 2 shows a flowchart illustrating one cottonseed cleaning process of the invention. In this process, the cottonseed are first sorted by size using a screen cleaner (e.g., a Cimbria Delta 108 screen cleaner). The small cottonseed are rejected and the big seeds proceed to the next step of sorting by weight using a gravity table (e.g., an Oliver Voyager gravity table). The light cottonseed are rejected, the heavy cottonseed are accepted, and the middle weight seed ("middlings") proceed to the next step of sorting by color. The discolored, light colored cottonseed are rejected and the dark colored cottonseed are accepted.
Figure 3:
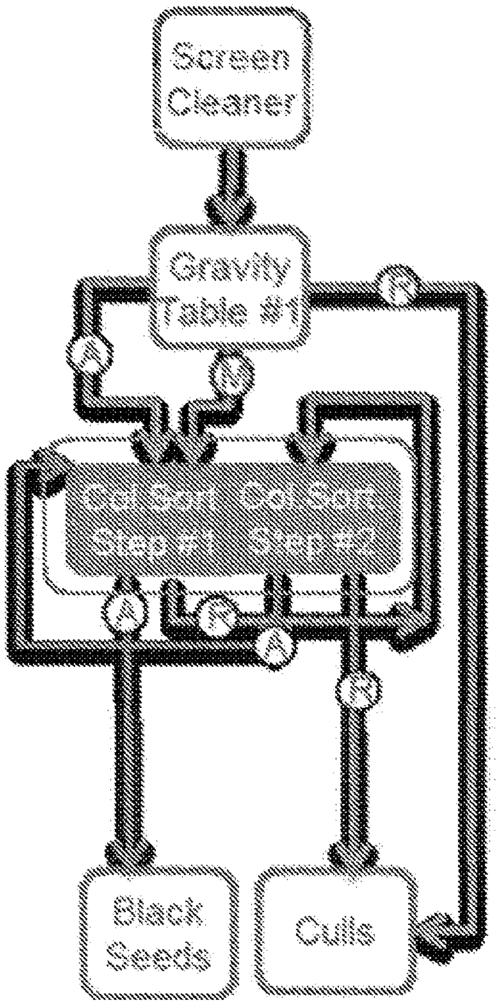
FIG. 3 shows a flowchart illustrating an alternative cottonseed cleaning process of the invention. In this process, the cottonseed are first sorted by size using a screen cleaner. The small cottonseed are rejected and the big seeds proceed to the next step of sorting by weight using a gravity table. The light cottonseed are rejected ("R"), and the heavy cottonseed ("A") and the middle weight seed ("M") proceed to the next step of sorting by color. The dark colored cottonseed are accepted ("A") and the discolored, light colored cottonseed ("R") proceed to the next step of sorting again by color. The dark colored cottonseed are accepted ("A") and the discolored and/or light colored cottonseed are rejected ("R").
Figure 4:
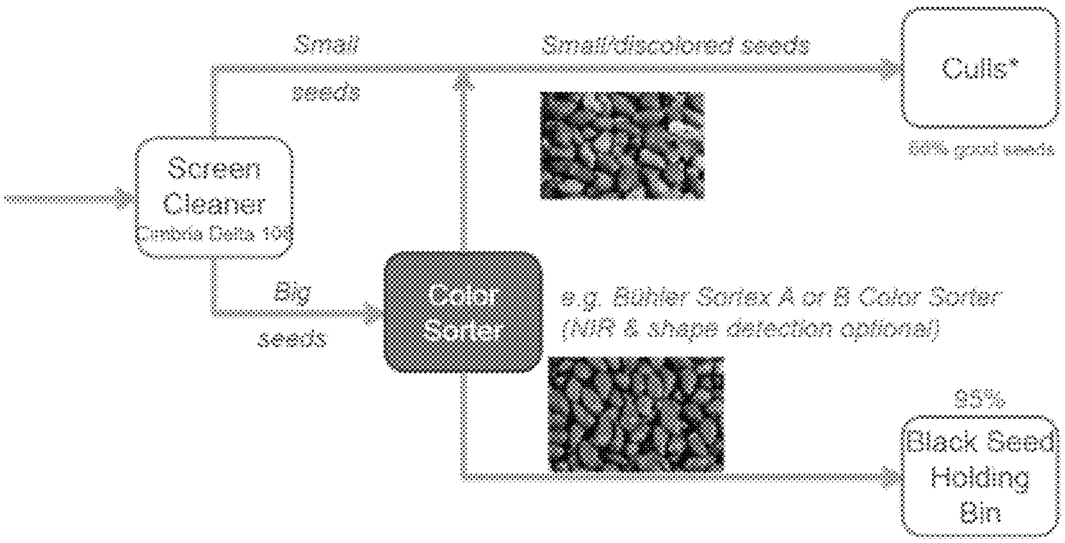
FIG. 4 shows a flowchart illustrating an alternative cottonseed cleaning process of the invention. In this process, the cottonseed are first sorted by size using a screen cleaner (e.g., a Cimbria Delta 108 screen cleaner). The small cottonseed are rejected and the big seeds proceed to the next step of sorting by color (e.g., a Bühler Sortex A or B color sorter). The discolored, light colored cottonseed are rejected and the dark colored cottonseed are accepted.

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

As used herein, the term "optical sorter" or "color sorter" refers to a device or machine that sorts items, such as seeds, according to color. Such optical sorters are known and are commercially available, e.g., from Bühler AG under the name "Sortex A".

As used herein, the term "optical sorting" or "color sorting" refers to sorting of items, such as seeds, according to color, e.g., using an optical sorter.

As used herein, the term "mechanical sorter" refers to a device or machine that sorts items, such as seeds, according to size and/or weight.

As used herein, the term "screen cleaner" refers to a mechanical sorter that sorts items, such as seeds, according to size. Such screen cleaners are known in the art and are commercially available.

As used herein, the term "gravity table" refers to a mechanical sorter that sorts items, such as seeds, according to weight or density. Such gravity tables are known in the art and are commercially available, e.g., from Oliver Manufacturing CO, Inc.

The standard practice for identification of high-quality cottonseed is to use mechanical sorting. Higher density cottonseed have better germination rates than low-density cottonseed. Thus, gravity tables are used to remove low-density cottonseed prior to packaging. Mid-density cottonseed may be sorted again by gravity to identify additional cottonseed that are acceptable.

As shown herein, it has been discovered that additional high-quality cottonseed may be identified by color of the cottonseed. This provides the advantage of providing more high-quality cotton seed, increasing customer satisfaction, and decreasing waste.

The subject disclosure features, in one aspect, a method for sorting cottonseed using an optical sorter. The color of cottonseed is an indicator of maturity. Darker cottonseed are mature, while lighter cottonseed is immature. Thus, high-quality cottonseed may be identified using an optical sorter programmed to separate dark cottonseed from light cottonseed.

The color sorting principle is based on the measurement of light reflection at the particle surface. The sorting system includes four components: feeding; inspection; signal processing; and ejection.

The product is dosed by vibrating a vibrating feeder. The feeding system includes at least one chute. The chute(s) may be in any orientation, including, but not limited to vertical or horizontal.

By means of a gravity chute, the particles dispersed are single particles, moving with nearly the same speed.

The inspection system includes lighting, background lighting and cameras. The inspection can be performed at different wavelengths. Specialized CCD (charged-coupled device), IR, UV, or RGB (full color red/green/blue) cameras receive the reflected light from the product and send this information to be amplified and classified. For a monochromatic sorter, there is only one filter in front of the camera, producing a basic light/dark separation. For a bichromatic sorter, two filters (visible/visible, visible/IR or IR/IR) are used to combine multiple wavelengths and provide for separation of less obvious color differences. Color sorters utilizing RGB technology use a full color camera instead of optical filters and can be programmed to sort products that may be difficult with other technologies.

The signal processing compares the measured light reflections with the desired values and decides if a particle is an accept or a reject. The system can be "trained" easily by manually sorting, for example, ten "right" and "wrong" particles and feeding these to the sorter. The limit between right and wrong can be adjusted as necessary.

Underneath the inspection system, a row of very small ejection nozzles is arranged. These nozzles are able to open and close within milliseconds to use a puff of air to shoot out the wrong particles.

Optical sorters can recognize an objects' color, size, shape, structural properties and chemical composition depending on the types of sensors and software used. The sorter compares objects to user-defined accept/reject criteria. The optical sorter according to the invention may be a monochromatic sorter or a polychromatic sorter. In some embodiments, the optical sorter according to the invention is a bichromatic sorter. In some embodiments, the optical sorter can sort by size and color.

Seed coat maturity is an important characteristic in determining cottonseed quality. Immature seeds are not as high in quality as are mature seeds. Seed coat color of mature seeds ranges from dark brown to black, depending on the variety. (See McCarty and Baskin, Cottonseed Quality Evaluation, Mississippi State University, 1978) Thus, in a preferred embodiment, the optical sorter accepts the dark (i.e., dark brown to black) cottonseed and rejects cottonseed that do not meet the acceptance criteria (i.e. any cottonseed lighter than dark brown).

The cottonseed may be sorted using an optical sorter once, twice, or several times. In a particular embodiment, the cottonseed are sorted once using an optical sorter. In another embodiment, the cottonseed are sorted twice using an optical sorter.

In some embodiments, the method for sorting cottonseed further comprises the use of a gravity table to remove the low-density cottonseed. In some embodiments, the cottonseed are sorted using an optical sorter prior to sorting by gravity table. In a preferred embodiment, the method for sorting cottonseed further comprises the use of a gravity table to remove the low-density cottonseed prior to sorting the cottonseed using an optical sorter. In a more preferred embodiment, a gravity table may be used to separate the cottonseed into three fractions prior to optical sorting: 1) "rejects" (i.e., low-density cottonseed); 2) "middlings" (i.e., mid-density cottonseed); and 3) "accepts" (i.e., high-density cottonseed). In some embodiments, the accepts are isolated and the rejects and middlings are then subjected to optical sorting. In some embodiments, only the middlings are then subjected to optical sorting. In other embodiments, only the rejects are then subjected to optical sorting.

The relationship between cottonseed density and germination rate has been documented (See, e.g. Delouche, Cotton Physiology, p. 503, FIG. 13, The Cotton Foundation, 1986). One of skill in the art can select the seed density of "rejects", "middlings", and "accepts" based on the desired germination rate for the collected cottonseed.

The cottonseed may be sorted using a gravity table once, twice, or several times prior to optical sorting. In a particular embodiment, the cottonseed are sorted once using a gravity table prior to optical sorting. In another embodiment, the cottonseed are sorted twice using a gravity table prior to optical sorting.

In another aspect, a method for cleaning cottonseed is provided comprising separation of cottonseed from debris, collection of high-density and mid-density cottonseed, and separation of dark cottonseed from light cottonseed using an optical sorter.

Separation of cottonseed from debris or other foreign material may be performed using a screen cleaner.

After the high-quality cottonseed are identified by optical sorting with or without gravity sorting, the high-quality cottonseed may be further treated prior to packaging. The treatment may involve contacting the seed, with an agriculturally/agronomically beneficial agent. As used herein and in the art, the term "agriculturally or agronomically beneficial" refers to agents that when applied to seeds result in enhancement (which may be statistically significant) of plant characteristics such as plant stand, growth, vigor or yield in comparison to non-treated seeds. Representative examples of such agents that may be useful in the practice of the present invention includes, but is not limited to, diazotrophs, mycorrhizal fungi, herbicides, fungicides, insecticides, and phosphate solubilizing agents.

Suitable herbicides include bentazon, acifluorfen, chlorimuron, lactofen, clomazone, fluazifop, glufosinate, glyphosate, sethoxydim, imazethapyr, imazamox, fomesafe, flumiclorac, imazaquin, and clethodim. Commercial products containing each of these compounds are readily available. Herbicide concentration in the composition will generally correspond to the labeled use rate for a particular herbicide.

A "fungicide" as used herein and in the art, is an agent that kills or inhibits fungal growth. As used herein, a fungicide "exhibits activity against" a particular species of fungi if treatment with the fungicide results in killing or growth inhibition of a fungal population (e.g., in the soil) relative to an untreated population. Effective fungicides in accordance with the invention will suitably exhibit activity against a broad range of pathogens, including but not limited to *Phytophthora, Rhizoctonia, Fusarium, Pythium, Phomopsis* or *Selerotinia* and *Phakopsora* and combinations thereof.

Commercial fungicides may be suitable for use in the present invention. Suitable commercially available fungicides include PROTEGE, RIVAL or ALLEGIANCE FL or LS (Gustafson, Plano, Tex.), WARDEN RTA (Agrilance, St. Paul, Minn.), APRON XL, APRON MAXX RTA or RFC, MAXIM 4FS or XL (Syngenta, Wilmington, Del.), CAPTAN (Arvesta, Guelph, Ontario), TRILEX (Bayer CropSciences), NUSAN (Wilbur-Ellis Agribusiness) and PROTREAT (Nitragin Argentina, Buenos Ares, Argentina). Active ingredients in these and other commercial fungicides include, but are not limited to, fludioxonil, mefenoxam, azoxystrobin, trifloxystrobin, 2-(thiocyanomethylthio)benzothiazole, and metalaxyl. Commercial fungicides are most suitably used in accordance with the manufacturer's instructions at the recommended concentrations.

As used herein, an insecticide "exhibits activity against" a particular species of insect if treatment with the insecticide results in killing or inhibition of an insect population relative to an untreated population. Effective insecticides in accordance with the invention will suitably exhibit activity against a broad range of insects including, but not limited to, wireworms, cutworms, grubs, corn rootworm, seed corn maggots, flea beetles, chinch bugs, aphids, leaf beetles, bollworms, boll weevils, thrips, spider mites, armyworms, plant bugs, whiteflies and stink bugs.

Commercial insecticides may be suitable for use in the present invention. Suitable commercially-available insecticides include CRUISER (Syngenta, Wilmington, Del.), GAUCHO, PONCHO, BAYTAN, and PONCHO/VOTiVO (Bayer CropScience), and LORSBAN (Dow Agrosciences). Active ingredients in these and other commercial insecticides include thiamethoxam, clothianidin, imidacloprid, triadimenol, triflumuron, fluopyram and chlorpyrifos. Commercial insecticides are most suitably used in accordance with the manufacturer's instructions at the recommended concentrations.

As used herein, phosphate solubilizing agents include, but are not limited to, phosphate solubilizing microorganisms. As used herein, "phosphate solubilizing microorganism" is a microorganism that is able to increase the amount of phosphorous available for a plant. Phosphate solubilizing microorganisms include fungal and bacterial strains. In one embodiment, the phosphate solubilizing microorganism is a spore forming microorganism.

A variety of additives can be added to the seed treatment. Binders can be added and include those composed, for example, of an adhesive polymer that can be natural or synthetic without phytotoxic effect on the seed to be coated. A variety of colorants may be employed, including organic chromophores classified as nitroso, nitro, azo, including monoazo, bisazo, and polyazo, diphenylmethane, triarylmethane, xanthene, methane, acridine, thiazole, thiazine, indamine, indophenol, azine, oxazine, anthraquinone, and phthalocyanine. Other additives that can be added include trace nutrients such as salts of iron, manganese, boron, copper, cobalt, molybdenum, and zinc. A polymer or other dust control agent can be applied to retain the treatment on the seed surface.

Any seed treatment used for cotton seeds can be used. Other conventional seed treatment additives include, but are not limited to, coating agents, wetting agents, buffering agents, and polysaccharides. At least one agriculturally acceptable carrier can be added to the seed treatment formulation such as water, solids or dry powders. The dry powders can be derived from a variety of materials such as wood barks, calcium carbonate, gypsum, vermiculite, talc, humus, activated charcoal, and various phosphorous compounds. In one embodiment, the seed coating can comprise of at least one filler, which is an organic or inorganic, natural or synthetic component with which the active components are combined to facilitate its application onto the seed. Preferably, the filler is an inert solid such as clays, natural or synthetic silicates, silica, resins, waxes, solid fertilizers (for example ammonium salts), natural soil minerals, such as kaolins, clays, talc, lime, quartz, attapulgite, montmorillonite, bentonite, or diatomaceous earths, or synthetic minerals, such as silica, alumina, or silicates, in particular aluminum or magnesium silicates. Other seed treatment additives include, but are not limited to, sodium lignosulfonate In some embodiments, the cottonseed is further sorted using an optical sorter to remove broken and/or damaged cottonseed prior to packaging. When cottonseed is broken, the white internal portion of the cottonseed is visible and may be identified using an optical sorter. The cottonseed to be sorted may be coated or uncoated.

The process of packaging and transporting the packaged seed can also damage the cottonseed. Thus, in some embodiments, packaged cottonseed is sorted using an optical sorter to remove broken and/or damaged cottonseed prior to planting.

One of skill in the art will understand that the steps of the methods described herein (i.e., mechanical sorting, optical sorting, coating, packaging) may be performed in any order. One of skill in the art will also understand that the cottonseed may be sorted multiple times.

A system is provided comprising a combination of one or more optical sorter(s) and one or more gravity table(s). In some embodiments, the system comprises an optical sorter and a gravity table. The optical sorter(s) and gravity table(s) may be any optical sorter or gravity table described herein or any other suitable optical sorter or gravity table. The use of optical sorter(s) and gravity table(s) may be combined in any order.

In some embodiments, the system further comprises means to transport cottonseed from one device to another device. For example, the system may comprise means to transport the reject cottonseed fraction, and optionally, the middling cottonseed fraction, from a gravity table and an optical sorter. Any suitable means for transporting cottonseed from one device to another device may be used, including, but not limited to, a conveyor belt, an auger, pneumatic or vacuum, a pan conveyor, and a vibratory conveyor.

The following Examples describe exemplary embodiments of the invention. These Examples should not be interpreted to encompass the entire breadth of the invention.

EXAMPLES

Evaluation of Optical Sorting of Cottonseed.

In order to improve the cotton seeds cleaning process, the applicability of an innovative optical separation technology, namely color sorting, was investigated in this study. Experiments for different cotton seed varieties and operation modes were performed using a color sorter type Sortex A (available from Bühler AG).

To get an initial overview of the performance of optical sorting within a reasonable time frame, 45 screening experiments were performed. All experiments were performed once, for each one sample was taken and analyzed, resulting in 150 samples.

In the present study, three cottonseed varieties were investigated for color sorting: Variety 1 type FiberMax FM2011GT, Variety 2 type FiberMax FM2334GLT, and Variety 3 type FiberMax FM1830GLT. Varietyl type FiberMax FM2011GT represents seeds that are easy to sort via mechanical sorting. Variety 2 type FiberMax FM2334GLT represents seeds difficult to sort via mechanical sorting.

Samples of finished coated seeds for all three varieties and screen cleaned seeds for variety 1 and 2 were used for the color sorting experiments.

Sorting parameter means the pre-pressure of the ejector nozzles was changed from 4 bars to 1.5 bar. Sorting experiments with the high pressure were named as "aggressive" sorting, the low pressure experiments were named as "less aggressive".

Table 1 provides an explanation of the nomenclature system used in these experiments.

TABLE 1

| Variety | Processed Product | Sorting Method | Sorting Parameter | Sample |
|---|---|---|---|---|
| V1:2011 | — | — | — | — |
| V2:2334 | — | — | — | — |
| V3:1830 | — | — | — | — |
| | S: screen cleaned seeds | — | — | — |
| | A: mechanical sorted accepts | — | — | — |
| | M: mechanical sorted middlings | — | — | — |
| | R: mechanical sorted rejects | — | — | — |
| | B: black seeds | — | — | — |
| | F: finished (coated) seeds | — | — | — |
| | | S1: color sorting 1 step | — | — |
| | | S2: color sorting 2 step | — | — |
| | | S3: shape (size) sorting | — | — |
| | | | P1: "aggressive" | — |
| | | | P2: "less aggressive" | — |
| | | | | A: accepts<br>C: control sample<br>R: rejects |

For example, V2_S_S2_P2_A means optical accepts from screen cleaned seeds Variety 2 type FiberMax FM2334GLT, color sorted with low nozzle pressure.

In the following, all comparisons of mechanical sorting versus optical sorting are based on standard (i.e. warm) germination rates and cool germination rates. Standard germination is performed at a temperature of between 20-30° C. Cool germination is performed at 18° C.

Experiment 1: Sorting of Coated Cottonseeds

Because of optical appearance issues of finished product there are non-sellable lots of coated material. Even if the germinations rates are in Spec, visible broken particles might cause customer complaints. The aim of this experiment is to determine if it is possible to change such lots to acceptable and marketable conditions by color sorting.

Coated Variety 2 type FiberMax FM2334GLT cottonseeds that contained broken seed parts were subjected to color sorting. Color sorting removed 1.4% of the finished product and visual inspection indicated that the broken seed parts were removed.

Similarly, Coated Variety 1 type FiberMax FM2011GT cottonseeds that contained broken seed parts were subjected to color sorting. Color sorting removed 0.5% of the finished product and visual inspection indicated that the broken seed parts were removed.

Figure 5:
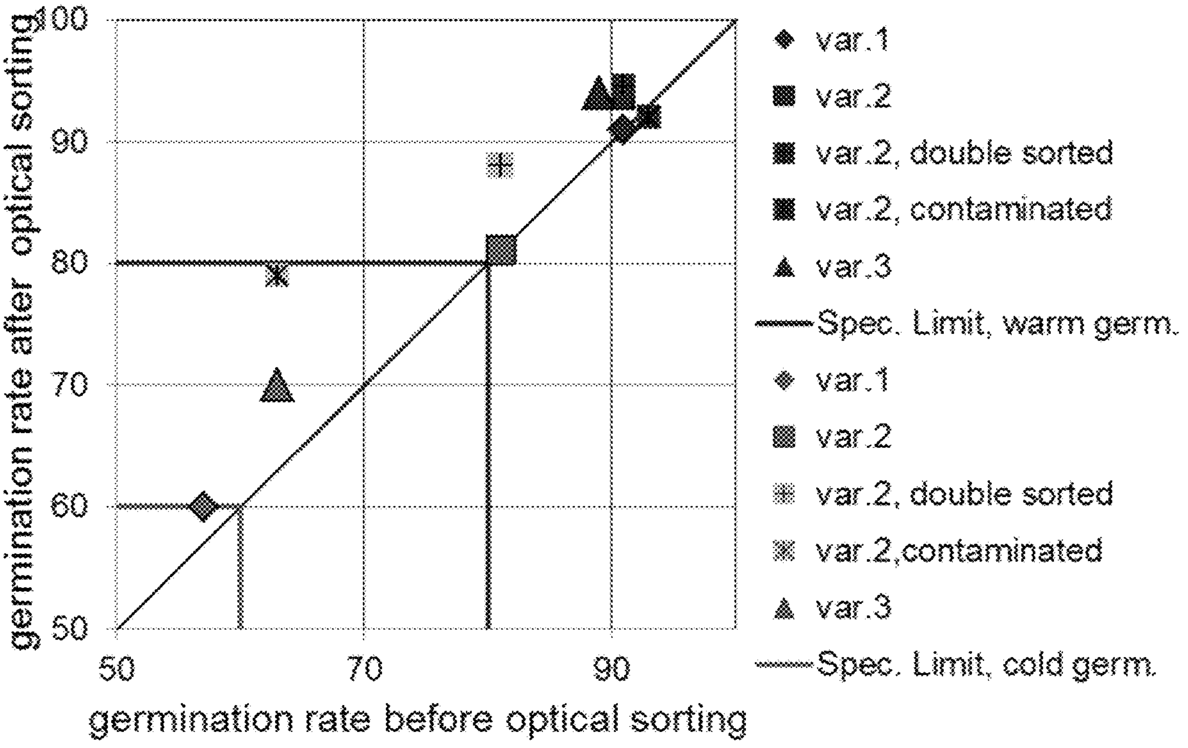
FIG. 5 shows the effect of optical sorting of coated cottonseeds to remove damaged and broken seeds prior to packaging on the warm germination rate and the cool germination rate before and after optical sorting.

Table 2 provides the quantitative results for color sorting of finished, coated seeds. These results are also provided in FIG. 5.

TABLE 2

| Exp. Code | Product loss % | Germ. rate, warm before op. sort % | Germ. rate, cool, after op. sort % | Δ germ. rate, warm, % | Germ. rate, cool before op. sort % | Germ. rate, cool, after op. sort % | Δ germ. rate, cool % |
|---|---|---|---|---|---|---|---|
| V3_F_S1_P2 | 4.5 | 89 | 94 | 5 | 63 | 70 | 7 |
| V1_F_S2_P1 | 1.1 | 91 | 91 | 0 | 57 | 60 | 3 |
| V2_F_S1_P1 | 1.4 | 91 | 94 | 3 | 81 | 81 | 0 |
| V2_F_S2_P1 | 2.7 | 91 | 94 | 3 | 81 | 88 | 7 |
| V2_C_S1_P1 | 0.5 | 93 | 92 | −1 | 63 | 79 | 16 |

These results demonstrate that the germination rates of finished products can be improved by color sorting.

Experiment 2: Improvement of Seed Cleaning Process by Optical Sorting

This experiment was performed to determine if optical sorting improves the germination rates of the cottonseeds.

Visual inspection of Variety 1 type FiberMax FM2011GT cottonseeds sorted by either mechanical (gravity) sorting or optical (color) sorting indicated that optical sorting was superior to mechanical sorting.

Figure 6:
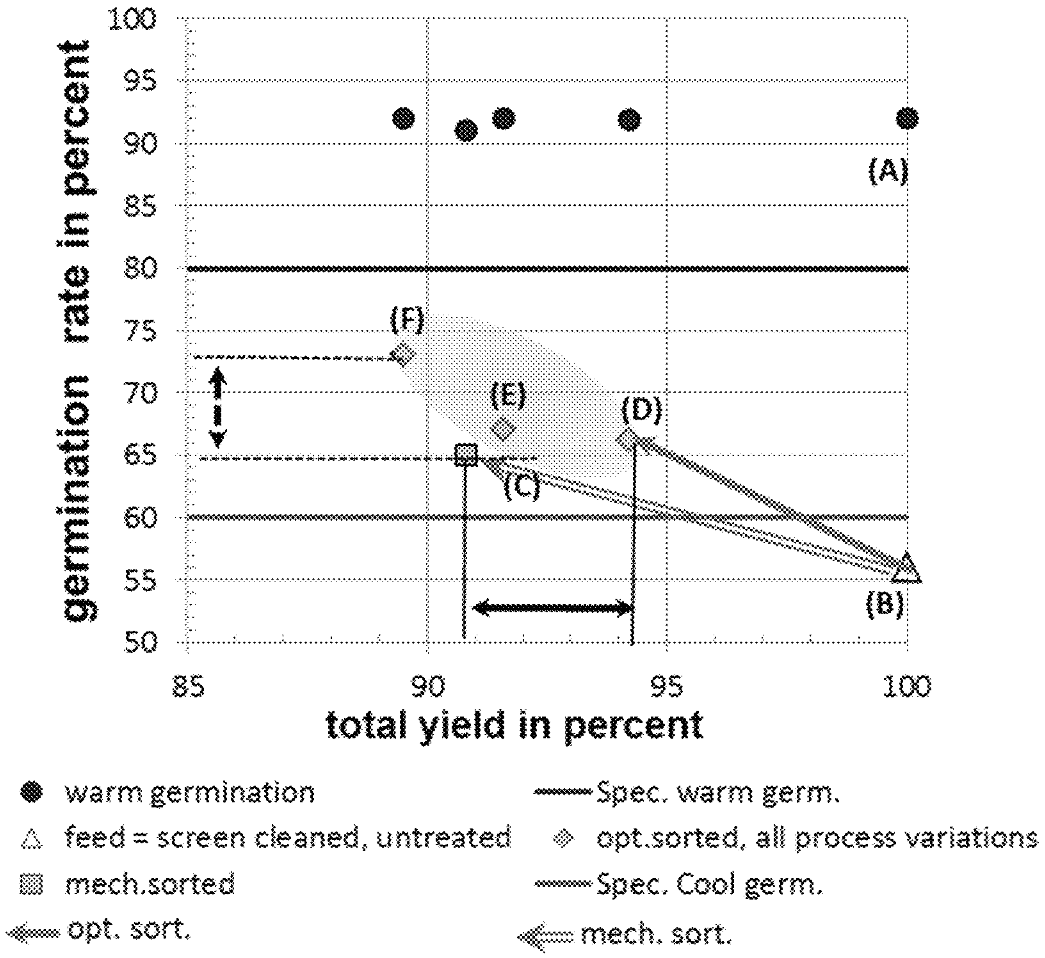
FIG. 6 shows the effect of optical sorting of Variety 1 type FiberMax FM2011GT cottonseeds on the warm germination rate, the cool germination rate, and yield. The warm germination rate starts from a high level (A) and for the performed experiments, the sorting method shows no significant influence on the germination rate obtained. The cool germination rate is a better standard of comparison. The cool germination rate of the feed product (screen cleaned seed) is 56% (B). Without any further treatment there is no product loss. The yield is here "100%". The cool germination rate of the mechanically sorted seed is 65% (C). The cool germination rate of the color sorted, 2 step, seed is 66.2% (D); the color sorted, 1 step, seeds is 67% (E); and the color+shape sorted seed is 73% (F). Depending on the process variation, the yield could be improved with more or less the same cool germination up to 3%. An ~8% higher germination rate is possible. In this case the yield is reduced in a range of 2%.

Quantitative results of Variety 1 type FiberMax FM2011GT cottonseeds sorted optically is provided in Table 3. These results are also provided in FIG. 6.

TABLE 3

| Fraction & Treatment | Exp. Code | % Yield | Germ. rate, warm, % | Germ. rate, cool, % |
|---|---|---|---|---|
| Screen cleaned | V1_S_S1_P2_C | 100 | 92 | 56 |
| Op. sort, 1 step | V1_S_S1_P2_A | 91.6 | 92 | 67 |
| Op. sort, 2 step | Calculated | 94.2 | 91.9 | 66.2 |
| Op. + grav. sort 1 step | V1_S_S3_P2_A | 89.5 | 92 | 73 |
| Grav. sort (black seeds) | V1_B_S1_P2_C | 90.8 | 91 | 65 |

The warm germination rate starts from a high level and for the performed experiments, the sorting method shows no significant influence on the germination rate obtained. The cool germination rate is a better standard of comparison.

The cool germination rate of the feed product (screen cleaned seeds) is 56%. Without any further treatment there is no product loss. Thus, the yield is "100%". Depending on the process variation, the yield could be improved with more or less the same cool germination up to 3%. An approximately 8% higher germination rate is possible. In this case the yield is reduced in a range of 2%.

Visual inspection of Variety 2 type FiberMax FM2334GLT cottonseeds sorted by either mechanical (gravity) sorting or optical (color) sorting indicated that optical sorting was superior to mechanical sorting.

With this variety, an additional operation parameter was checked. The prepressure of the separating nozzles was changed. The two methods are named "more aggressive sorting" and "less aggressive sorting". It was theorized that a high pressure ("more aggressive") should reach a better separation of the wrong colored particles under acceptance of a higher loss of good product.

Figure 7:
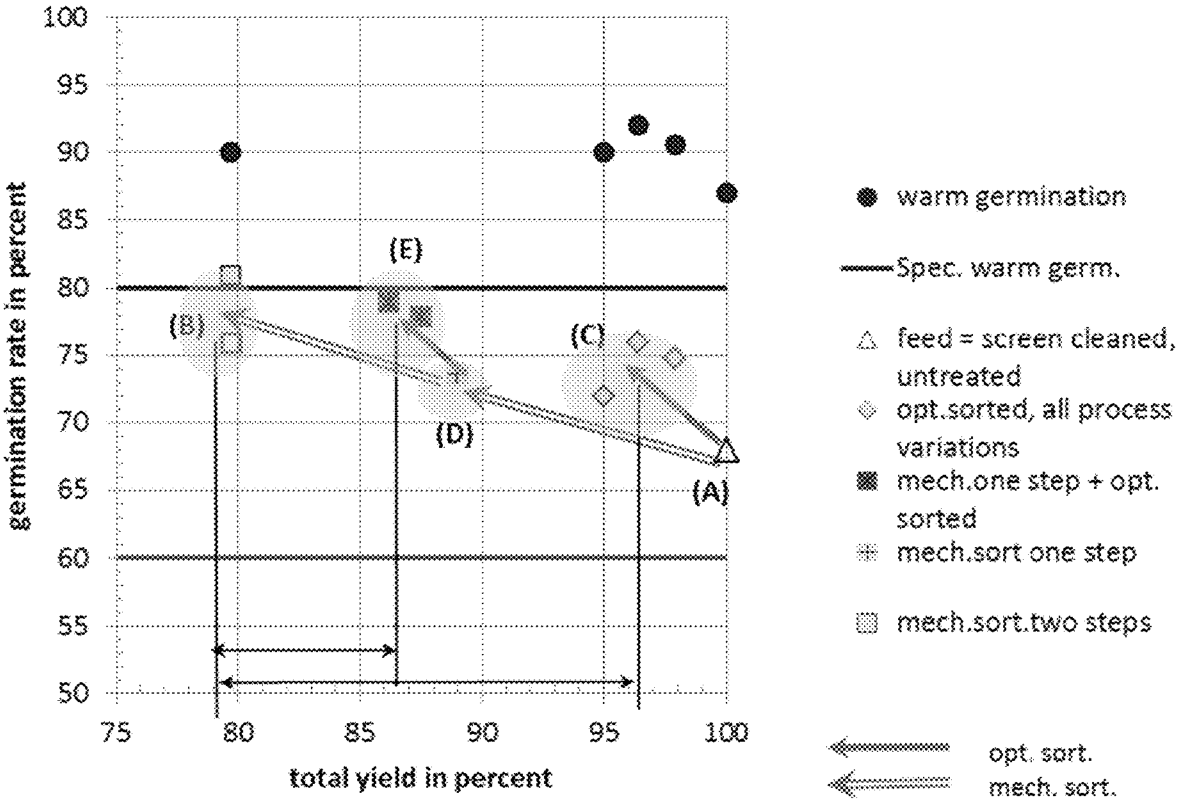
FIG. 7 shows the effect of optical sorting of Variety 2 type FiberMax FM2334GLT cottonseeds with or without gravity sorting on the warm germination rate, the cool germination rate, and yield. The cool germination rate for the screen cleaned only cottonseed (A) was calculated from the results of the control samples of middlings, accepts, and rejects multiplied with the mass percentage. The cool germination rate for the mechanically sorted cottonseed (two sorts) is 81% (B). The cool germination rate for the optically sorted, screen cleaned cottonseed is 76% (C). The cool germination rate for the mechanically sorted (one sort) cottonseed is 73.6% (D); which was calculated from the mixture of the accepts and middlings of the first gravity table. The cool germination rate for the mechanically sorted (one sort) and color sorted (one sort) cottonseed is 77.9% (E); which was calculated from the mixture of the optical accepts of the mechanical accepts and middlings.

Quantitative results of Variety 2 type FiberMax FM2334GLT cottonseeds sorted optically is provided in Table 4. These results are also provided in FIG. 7.

TABLE 4

| Fraction & Treatment | Exp. Code | % Yield | Germ. rate, warm, % | Germ. rate, cool, % |
|---|---|---|---|---|
| Screen cleaned | Calculated, no sample available | 100 | 87 | 68 |
| Grav. sort, 2 step (black seeds) | V2_B_S1_P1 + 2_C | 79.7 | 90 | 81 |
| Accepts 1. grav table, control sample as comparison for black seeds | V2_B_S1_P1 + 2_C | " | 90 | 76 |
| Screen cleaned, op. sort, 1 step | V2_S_S1_P2_A | 96.4 | 92 | 76 |
| Op. + grav. sort, 1 step | V2_S_S3_P2_A | 95 | 90 | 72 |
| Op. sort, 2 step | Calculated | 97.9 | 90.6 | 74.8 |
| Grav. sort, 1 step (mixture of accepts & middlings) | Calculated | 89 | | 73.6 |
| Grav. sort, 1 step + op. sort, 1 step | Calculated | 87.5 | | 77.9 |
| Grav. sort, 1 step + op. + grav. sort, 1 step | Calculated | 86.2 | | 79 |

There was no analysis of the germination rate of the screen cleaned seeds. This value is calculated from the results of the control samples of middlings, accepts and rejects, multiplied with the mass percentage.

The cool germination rate in the mechanically sorted, 2 step, black seeds is very high. This value is questionable, because the germination of the accept control sample is lower. The best fraction of the first gravity table cannot be worse compared to the mixture of accepts from two gravity tables=black seeds.

The mechanically sorted, 1 step is a theoretical result, calculated as a mixture of the accepts and middlings of the first gravity table. Similarly, the mechanically sorted, 1 step, + color sorted is a theoretical result, calculated as a mixture of the optical accepts of the mechanical accepts and middlings.

The optical sorting method has a very high yield (95% compared to 80% mechanical cleaned). But it does not reach the cool germination rate of the mechanical cleaned seeds. The reason is the existence of optical faultless seeds of a light weight and a very low germination rate. These seeds cannot be separated by a color sorter.

With a combination of a one-step mechanical cleaning to separate the light seeds and a following optical sorting a high germination rate and an acceptable yield should be achieved. To get an idea about the expectable result, germination rates of mixtures of the optical sorted mechanical accepts and middlings were calculated.

The germination rates of the mechanical sorted seeds should be nearly reached and the yield should be improved in a range of five percent or more.

The examples demonstrate that the incorporation of optical sorting into cottonseed cleaning improves yield and germination rates of the resulting cottonseed.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

What is claimed is:

1. A device or system for cleaning and/or sorting cottonseed, comprising:

a) a gravity table configured to sort cottonseed into a high-density seed fraction, a middensity seed fraction, and a low-density seed fraction; and b) an optical sorter configured to sort the mid-density seed, and optionally, the lowdensity seed to collect dark cottonseed, wherein the device or system is configured to combine the high-density seed fraction of a) and the dark cottonseed of b) to obtain a high-quality seed fraction.

2. The device or system of claim 1, wherein the optical sorter is further configured to sort the high-quality cottonseed fraction to remove broken, misshaped, and/or damaged cottonseed.

3. The device or system of claim 1, wherein the optical sorter is further configured to accept the dark colored cottonseed and reject the light cottonseed.

4. The device or system of claim 1, wherein the optical sorter is a monochromatic sorter that separates the cottonseed by shade of color.

5. The device or system of claim 1, wherein the optical sorter is a bichromatic sorter that separates the cottonseed using two filters to combine multiple wavelengths.

6. The device or system of claim 1, wherein the optical sorter is further configured to sort the mid-density seed and the low-density seed to collect dark cottonseed.

7. The device or system of claim 1, further comprising a screen cleaner.

* * * * *